(12) United States Patent
Cordazzo et al.

(10) Patent No.: US 9,726,782 B2
(45) Date of Patent: Aug. 8, 2017

(54) METHODS, SYSTEMS AND COMPUTER PROGRAM STORAGE DEVICES FOR GENERATING A RESPONSE TO FLOODING

(71) Applicant: International Business Machines Corporation, Armonk, NY (US)

(72) Inventors: Jonas Cordazzo, Calgary (CA); Ulisses T. Mello, Blauvelt, NY (US); Elena A. Novakovskaia, Chappaqua, NY (US); Lloyd A. Treinish, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 13/690,821

(22) Filed: Nov. 30, 2012

(65) Prior Publication Data

US 2014/0156190 A1    Jun. 5, 2014

(51) Int. Cl.
  *G01W 1/10* (2006.01)
  *G01W 1/14* (2006.01)
  *G06F 15/00* (2006.01)

(52) U.S. Cl.
  CPC ............... *G01W 1/10* (2013.01); *G01W 1/14* (2013.01)

(58) Field of Classification Search
  CPC ....................................................... G01W 1/10
  USPC ............................................................. 702/3
  See application file for complete search history.

(56) References Cited

U.S. PATENT DOCUMENTS

| | | |
|---|---|---|
| 5,342,144 A | 8/1994 | McCarthy |
| 5,406,481 A | 4/1995 | Shinozawa et al. |
| 5,608,171 A | 3/1997 | Hunter et al. |
| 5,717,589 A | 2/1998 | Thompson et al. |
| 5,835,386 A | 11/1998 | Orr et al. |
| 5,850,619 A | 12/1998 | Rasmussen et al. |
| 5,959,567 A | 9/1999 | Wolfson et al. |
| 6,018,699 A | 1/2000 | Baron et al. |
| 6,581,009 B1 | 6/2003 | Smith |
| 6,947,842 B2 | 9/2005 | Smith et al. |
| 7,039,565 B1 | 5/2006 | Jin et al. |
| 7,136,756 B1* | 11/2006 | Vieux ............... G06T 17/05 702/3 |
| 7,395,157 B2 | 7/2008 | Feyen et al. |

(Continued)

FOREIGN PATENT DOCUMENTS

| | | |
|---|---|---|
| EP | 0 879 429 | 10/1996 |
| JP | 8120752 A | 5/1996 |

(Continued)

OTHER PUBLICATIONS

Martin, N. and S.M. Gorelick, "MOD_FreeSurF2D: a MATLAB surface fluid flow model for rivers and streams", 2005 Computers and Geosciences, vol. 31, p. 929-946.

(Continued)

*Primary Examiner* — Michael Nghiem
*Assistant Examiner* — Peter Ngo
(74) *Attorney, Agent, or Firm* — Scully, Scott, Murphy & Presser P.C.; Daniel P. Morris

(57) ABSTRACT

The present disclosure relates generally to methods, systems and computer program storage devices for generating a response to flooding. In one specific example, the present disclosure relates to methods, systems and computer program storage devices for generating one or more operational responses to flooding.

17 Claims, 10 Drawing Sheets

(56) References Cited

U.S. PATENT DOCUMENTS

| | | | |
|---|---|---|---|
| 2003/0037146 A1 | 2/2003 | O'Neill | |
| 2003/0097230 A1 | 5/2003 | Garabedian | |
| 2010/0131202 A1* | 5/2010 | Dannevik | G01W 1/00 702/3 |
| 2012/0150783 A1* | 6/2012 | Jung | G05B 15/02 706/46 |
| 2014/0156232 A1* | 6/2014 | Cordazzo | G06F 17/5018 703/2 |

FOREIGN PATENT DOCUMENTS

| | | | |
|---|---|---|---|
| JP | 2002-298063 A | | 10/2002 |
| JP | 2004-164591 A | | 6/2004 |
| KR | 2003-0043115 A | | 6/2003 |

OTHER PUBLICATIONS

Casulli, V. and Walters, R.A., "An Unstructured Grid,Three-Dimensional Model based on the Shallow Water Equations", Int. Jour. For Numerical Methods in Fluids, vol. 32, No. 3, pp. 331-348(2000).
Begnudelli, L. and Sanders, B.F., "Unstructured grid finite-volume algorithm for shallow-water flow and scalar transport with wetting and drying". J. Hydraul. Eng., Apr. 2006, v132 i4., pp. 371-384.
Gottardi G.; Venutelli M., "Landflow: Computer program for the numerical simulation of two-dimensional overland flow". Computer and Geosciences. v 23, n. 1, pp. 77-89, Fev 1997, abstract only. http://adsabs.harvard.edu/abs/1997CG, printed Apr. 15, 2014.
http://www.docstoc.com/docs/166484086/bayesian-calibration-of-a-flood-inundation-model,"Bayesian Calibration of a Flood Inundation Model", 2 pgs., printed Apr. 15, 2014.
http://webcache.googleusercontent.com/search?q=cache:iLpekYPG7_cJ:http://ns1.mrcmek, "A New Mechanism for Sound and Sustainable Integrated Flood Management", 5 pgs., printed Apr. 16, 2014.
http://onlinelibrary.wiley.com/doi/10.1111/j.1752-1688.2007.00027.x/abstract, "Multi-Criteria Decision Support Systems for Flood Hazard Mitigation and Emergency Response in Urban Watersheds", 3 pgs.,printed Apr. 15, 2014.
Butts, M.,et al., "A Flood Forecasting System: Integrating Web, Gis and Modelling Technology", 2006, pp. 1-10.
Butts, M.,et al., "Integrating Meteorological Information and Uncertainty Into Flood Forecasting—The Floodrelief Decision Support System", 2005 Geophysical Research Abstracts, vol. 7, 03289, pp. 1-2.
Dietrich, J., et al. "Combination of Different Types of Ensembles for the Adaptive Simulation of Probabilistic Flood Forecasts: Hindcasts for the Mulde 2002 Extreme Event", 2008 Nonlin. Processes Geophys., vol. 15, pp. 275-286.
Skamarock, W.C., et al. "A Description of the Advanced Research WRF Version 3", NCAR Technical Note, Jun. 2008, pp. 1-125.
http://www.ipcc.ch/, "Fifth Assessment Report (AR5), Intergovernmental Panel on Climate Change", pp. 1-2, printed Apr. 16, 2014.
https://ams.confex.com/ams/89annual/techprogram/program_516.htm, Symposium of Urban High Impact Weather (Compact View), pp. 1-4, printed Apr. 16, 2014.
http://gis.nyc.gov/dob/fm/index.htm, "NYC Buildings", 1 pg., printed Apr. 16, 2014.
http://en.wikipedia.org/wiki/Ensemble_forecasting, "Ensemble forecasting", pp. 1-6, printed May 22, 2012.
http://en.wikipedia.org/wiki/Probabilistic_forecasting, "Probabilistic forecasting", pp. 1-3, printed May 22, 2012.
Novakovskaia, E., et al. "An Integrated Hydro-Meterorological System for Flood Forecasting in the New York City Metropolitan Area". Second Tri-State Conference, Western Connecticut University, Apr. 2009, 1 pg.
Novakovskaia, E., et al. "Calibration and Verification of a HydroMeteorological System for Urban Flash Flood Forecasting", 2008, Eos Trans. American Geophysical Union, 89(53), Fall Meet. Suppl., H43D-1047, San Francisco, CA., 1 pg.
http://randd.defra.gov.uk/Document.aspx?Document=FD2901_6230_TRP.pdf, "Probabilistic Flood Forecasting Scoping Study", 216 pgs., printed Apr. 16, 2014.
http://www.nap.edu/catalog.php?record_id=9971, "Risk Analysis and Uncertainty in Flood Damage Reduction Studies", abstract, 1 page, printed Apr. 16, 2014.
Deltares, Flood Risk Analysis Products and Services, Sep. 2011, pp. 1-4.
http://en.wikipedia.org/wiki/Shallow_Water_Equations, "Shallow Water Equations", 3 pgs., printed Nov. 27, 2012.
http://en.wikipedia.org/wiki/Chain_Rule, "Chain Rule", 8 pgs., printed Nov. 27, 2012.
http://web.archive.org/web/201203329023755/http://www.deltaresystems.com/hydro/prod.,"Hydro/High Quality Design and Analysis Software Products", 1 pg., archived Mar. 29, 2012, printed Jan. 24, 2014.
http://web.archive.org/web/20120329101333/http://www.deltaresystems.com/hydro/prod.,"SOBEK Suite", 3 pgs., archived Mar. 29, 2012, printed Jan. 24, 2014.
http://en.wikipedia.org/wiki/Geoid, "Geoid" , 6 pgs., printed Aug. 2, 2012.
http://en.wikipedia.org/wiki/World_Geoidetic_System, "World Geoidetic System", 7 pgs., printed Aug. 2, 2012.
http://en.wikipedia.org/wiki/Divergence_theorem, "Divergence theorem", 7 pgs., printed Jun. 7, 2012.
http://en.wikipedia.org/wiki/Finite_volume_method, "Finite_volume_method", 4 pgs., printed Jun. 7, 2012.
http://en.wikipedia.org/wiki/Jacobian_matrix_and_determinant, "Jacobian matrix and determinant", 4 pgs., printed Apr. 21, 2014.
Deltares Systems, "D-Water Quality", User Manual, 2013, pp. 325-360.
Regional Stimulation Model (RSM), Theory Manual, 308 pgs., updated on May 16, 2005, South Florida Water Management District, West Palm Beach, FL.
Deltares Systems, SOBEK, 1D/2D modelling suite for integral water solutions, Hydrodynamics, Rainfall Runoff and Real Time Control, User Manual, 910 pages.
Kolditz, O., et al. "A Compartment Approach for Hydrosystem Analysis Based on Object-Oriented Principles", University of Tubingen, Center for Applied Geosciences, Chair of GeoSystemsResearch, J. Enviromental Modelling and Software Jul. 2006; 00.1-0, pp. 1-31.
Leuenberger, D., et al. "Application of an Empirical Quality Function for Radar QPE in an NWP model", ERAD 2010—The Sixth European Conference on Radar in Meteorology and Hydrology, Jun. 30, 2010, pp. 1-6.
Mello, U.T., et al. "A Control-volume Finite-element Method for Three-dimensional Multiphase Basin Modeling" Marine and Petroleum Geology, 2009 Marine and Petroleum Geology 26, pp. 504-518.
Beinhom, M., et al. "Overland Flow Theory and Implementation", Center of Applied Geosciences, University of Turbingen, Mar. 2005, pp. 1-11.
Ponce, et al. "Applicability of Kinematic and Diffusion Models", Mar. 1978, Journal of the Hydraulics Division (ASCE Publications), vol. 104, No. 3, pp. 353-360.
http://web.archive.org/web/20120330143223/http://www.deltaresystems.com/hydro/prod.,"D-Ecology", 1 pg., archived Mar. 30, 2012, printed Jan. 24, 2014.
http://web.archive.org/web/20120329100424/http://www.deltaresystems.com/hydro/prod.,"Delft3D Suite/3D/2D modelling suite for integral water solutions", 3 pgs., archived Mar. 29, 2012, printed Jan. 24, 2014.
http://web.archive.org/web/2012033043952/http://www.deltaresystems.com/hydro/prod.,"Delft3D Suite/3D Suite", 2 pgs., archived Mar. 30, 2012, printed Apr. 16, 2014.
http://web.archive.org/web/20120330143202/http://www.deltaresystems.com/hydro/prod.,"D-Flow 1D Open Water", 1 pg., archived Mar. 30, 2012, printed Jan. 24, 2014.
http://web.archive.org/web/20120330142223/http://www.deltaresystems.com/hydro/prod.,"D-Flow 1D Pipes",1 pg., archived Mar. 30, 2012, printed Jan. 24, 2014.

(56) References Cited

OTHER PUBLICATIONS http://web.archive.org/web/20120330080242/http://www.deltaresystems.com/hydro/prod.,"D-Flow 2D Overland", 1 pg., archived Mar. 30, 2012, printed Jan. 24, 2014.
http://web.archive.org/web/20120330142233/http://www.deltaresystems.com/hydro/prod.,"D-Flow", 1 pg., archived Mar. 30, 2012, printed Jan. 24, 2014.
http://web.archive.org/web/20120330143207/http://www.deltaresystems.com/hydro/prod.,"D-Water Quality 1D", 1 pg., archived Mar. 30, 2012, printed Jan. 24, 2014.
http://web.archive.org/web/20120330142238/http://www.deltaresystems.com/hydro/prod.,"D-Morphology", 2 pgs., archived Mar. 30, 2012, printed Jan. 24, 2014.
http://web.archive.org/web/20120330142249/http://www.deltaresystems.com/hydro/prod.,"D-Particle Tracking", 2 pgs., circa Mar. 2012, printed Jan. 24, 2014.
http://web.archive.org/web/20120330142228/http://www.deltaresystems.com/hydro/prod.,"D-Rainfall Runoff Open Water", 1 pg., archived Mar. 30, 2012, printed Jan. 24, 2014.
http://web.archive.org/web/20120330143213/http://www.deltaresystems.com/hydro/prod.,"D-Real Time Control", 1 pg., archived Mar. 30, 2012, printed Jan. 24, 2014.
http://web.archive.org/web/20120330143217/http://www.deltaresystems.com/hydro/prod.,"D-Water Quality", 1 pg., archived Mar. 30, 2012, printed Jan. 24, 2014.
http://web.archive.org/web/20120330142244/http://www.deltaresystems.com/hydro/prod.,"D-Waves", 1 pg., archived Mar. 30, 2012, printed Jan. 24, 2014.
Li, X. et al., "A Web-based flood forecasting system for Shuangpai region", Advances in Engineering Software, (Mar. 2006), vol. 37, Issue 3, pp. 146-158
Musall, M. et al., "Hydraulic Modelling", Chapter 9, Fllod Risk Assessment and Management, Springer, (2011) pp. 187-209
Prieur, N. C., "Development of a 1D-2D coupled hydrodynamic model for the Oyeren Delta in southern Norway", Master Thesis in Geiosciences, (2011), 101 pages.
"Manual on Flood Forecasting and Warning", World Meteorological Organziation, (2011), WMO-No. 1072, 142 pages.
U.S. Office Action dated Oct. 28, 2015 issued in U.S. Appl. No. 13/690,871.
Henonin, J. et al., "Urban Flood Real-Time Forecasting and Modelling: A State-Of-The-Art Review", Mike by DHI Conference, (Sep. 6-8, 2010), 21 pages.
U.S. Office Action dated Apr. 6, 2016 issued in U.S. Appl. No. 13/690,871, 19 pages.

\* cited by examiner

METHODS, SYSTEMS AND COMPUTER PROGRAM STORAGE DEVICES FOR GENERATING A RESPONSE TO FLOODING

CROSS-REFERENCE TO RELATED APPLICATIONS

The present application related to U.S. patent application Ser. No. 13/690,871, filed Nov. 30, 2012, now abandoned, entitled METHODS, SYSTEMS AND COMPUTER PROGRAM STORAGE DEVICES FOR GENERATING A FLOODING FORECAST, the entire contents and disclosure of which is incorporated by reference as if fully set forth herein.

BACKGROUND

The present disclosure relates generally to methods, systems and computer program storage devices for generating a response to flooding.

In one specific example, the present disclosure relates to methods, systems and computer program storage devices for generating one or more operational responses to flooding.

Flooding, and especially flash floods, often create conditions that slow traffic and cause major congestion and delays on expressways, highways, and other regional transit systems. Moreover, urbanization, shifts in land use patterns and related changes in surface permeability have reduced the ability for the ground to absorb precipitation, which lowers the peak run-off and causes an increase in the likelihood of a flood.

In the recent past, severe storms have impacted several large cities around the world, producing floods and significant property damage due to the lack of adequate flood warning systems. Such problems have occurred in major cities around the world. For example, the New York City metropolitan area was impacted by a mesoscale convective system ("MCS") in August 2007, with rainfall exceeding three inches in less than two hours in some areas. The subway system was partially closed due to flooding, streets were impassable, and over two and a half million people and numerous businesses were affected. A similar flooding event happened in July of 2007 in London. The flooding significantly impacted the Underground transportation system during the evening rush hour leading to the closing of many tube stations and forcing riders to utilize overcrowded buses.

In the United States, average annual flood losses have nearly tripled since 1950 from $1.5 billion to more than $4 billion. In the 1990s alone, average annual flood losses have exceeded $7 billion. Between 1995 and 1999 alone, flood damage topped $40 billion. In the United Kingdom, flood damage during the summer of 2007 exceeded 3.2 billion British Pounds.

Due to climate change it is likely that heavy and highly variable precipitation events will increase in frequency in regions already vulnerable to flooding events. Coastal regions will also be at an increased risk for flooding as sea levels rise and the frequency of coastal storms increases. The cost associated with the damage from flooding is likely to rise and the number of people affected by flooding will increase.

DESCRIPTION OF RELATED ART

Conventional systems typically lack provision of optimal guidance and underlying information to plan for or respond to flooding events. Typical efforts focus on merely having better flood forecasts or measurements of floods. Such efforts are typically insufficient to enable effective plans or responses to mitigate the impacts of floods.

SUMMARY

The present disclosure relates generally to methods, systems and computer program storage devices for generating a response to flooding.

In one specific example, the present disclosure relates to methods, systems and computer program storage devices for generating one or more operational responses to flooding.

In one embodiment, a computer-implemented system for generating a recommended response to flooding is provided, the system comprising: a decision support system; a hydrometeorological system coupled to an observing network; and a geo-located valuation data stream; wherein the geo-located valuation data stream is in operative communication with the coupled hydrometeorological system and observing network such that the geo-located valuation data stream receives from the coupled hydrometeorological system and observing network an estimation of forecast uncertainties; wherein the geo-located valuation data stream is in operative communication with the decision support system such that the decision support system receives from the geo-located valuation data stream a valuation of expected flood damage, wherein the valuation of expected flood damage is based at least in part upon the received estimation of forecast uncertainties; and wherein at least one of the following is provided: (a) feedback via operative communication from the decision support system to one or more of the hydrometeorological system, the observing network, the geo-located valuation data stream and the decision support system, wherein the feedback from the decision support system improves flood forecast accuracies at specified locations and times; and (b) adaptive dynamic refinement via operative communication from the decision support system of one or more of the hydrometeorological system, the observing network and the geo-located valuation data stream to initiate a valuation of expected flood damage.

In another embodiment, a method for generating a recommended response to flooding is provided, the method comprising: receiving by a geo-located valuation data stream, from a coupled hydrometeorological system and observing network, an estimation of forecast uncertainties; receiving by a decision support system, from the geo-located valuation data stream, a valuation of expected flood damage, wherein the valuation of expected flood damage is based at least in part upon the received estimation of forecast uncertainties; and performing at least one of: (a) providing feedback from the decision support system to one or more of the hydrometeorological system, the observing network, the geo-located valuation data stream and the decision support system, wherein the feedback from the decision support system improves flood forecast accuracies at specified locations and times; and (b) providing adaptive dynamic refinement of one or more of the hydrometeorological system, the observing network and the geo-located valuation data stream to initiate a valuation of expected flood damage.

In another embodiment, a program storage device readable by machine, tangibly embodying a program of instructions executable by the machine for generating a recommended response to flooding is provided, the program of instructions, when executing, performing the following steps: receiving by a geo-located valuation data stream, from a coupled hydrometeorological system and observing network, an estimation of forecast uncertainties; receiving by a decision support system, from the geo-located valuation data stream, a valuation of expected flood damage, wherein the valuation of expected flood damage is based at least in part upon the received estimation of forecast uncertainties; and performing at least one of: (a) providing feedback from the decision support system to one or more of the hydrometeorological system, the observing network, the geo-located valuation data stream and the decision support system, wherein the feedback from the decision support system improves flood forecast accuracies at specified locations and times; and (b) providing adaptive dynamic refinement of one or more of the hydrometeorological system, the observing network and the geo-located valuation data stream to initiate a valuation of expected flood damage.

DETAILED DESCRIPTION

Figure 1:
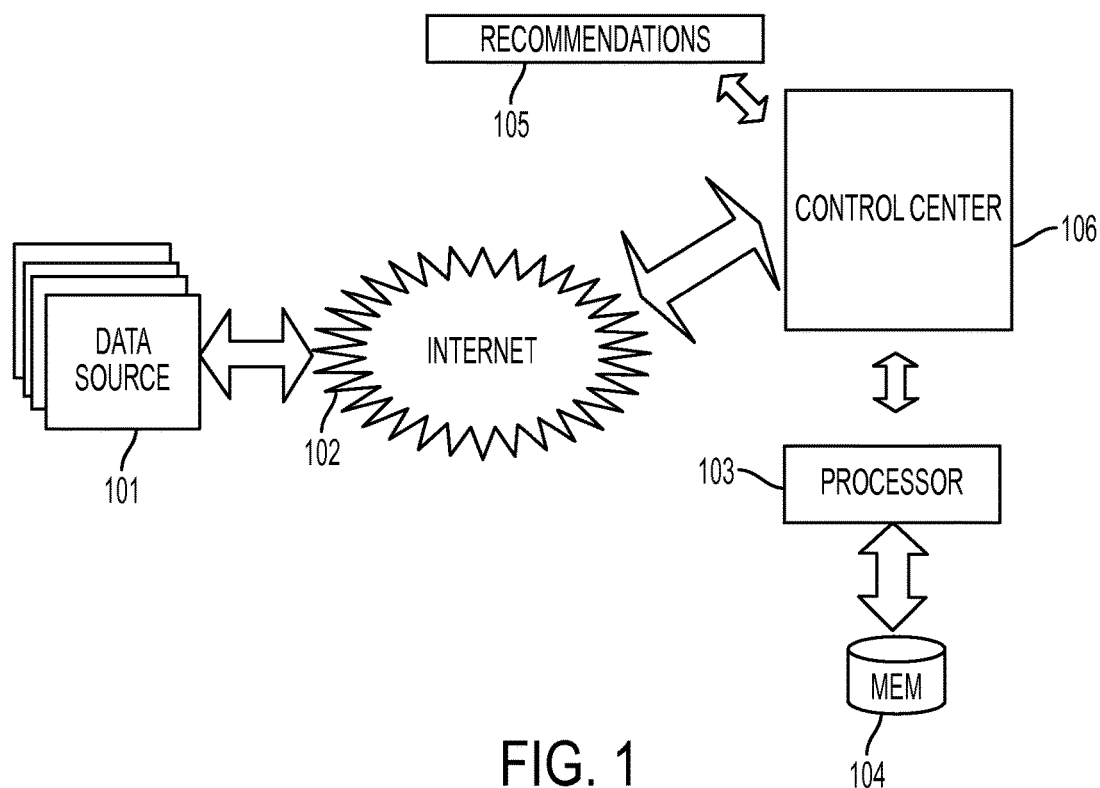
FIG. 1 depicts a block diagram of a system according to one embodiment.

For the purposes of description the term "real-time" is intended to refer to a system having a response to a given input or event that occurs approximately contemporaneously in time (e.g., without significant time lag between input and system response but not necessarily instantaneously).

For the purposes of description the term "decision support system" or ("DSS") is intended to refer to a computer-based information system that supports business and/or organizational decision-making activities. A DSS may serve the management, operations, and planning levels of an organization and helps to make decisions, which may be rapidly changing and not easily specified in advance.

For the purposes of description the term "operational linkage to a decision support system" is intended to refer to a mechanism for operative bi-directional communication with a decision support system.

For the purposes of description the term "hydrometeorological system" or ("HMS") is intended to refer to a system that couples the functionalities of meteorological and hydrological models. A hydrometeorological system may perform tasks related to data acquisition, weather and surface runoff computations and forecast and the tuning of models to improve its forecasts.

For the purposes of description the term "observing network" or ("ON") is intended to refer to one or more physical sensors (or the like) for measuring one or more conditions (e.g., rainfall, flooding level, vehicle traffic speed).

For the purposes of description the term "geo-located valuation data stream" or ("GVD") is intended to refer to a component that contains detailed socio-economic, infrastructure and/or environmental information for locations of interest so that decisions can be customized to these particular conditions.

For the purposes of description the term "recommended flood response" or ("RFR) is intended to refer to one or more instructions regarding response (e.g., an operation response) to a predicted or actual flooding event.

For the purposes of description the term "recommended flood response interface" or ("RFRI") is intended to refer to a mechanism (e.g., computer system, software, video monitor and/or hardcopy printout) for providing to one or more recipients a recommended flood response. In one example, a recommend flood response interface may also receive back feedback from one or more recipients of a recommended flood response.

For the purposes of description the term "configuration" is intended to refer to the setup of a system, component, module, process or the like.

For the purposes of description the term "calibration" is intended to refer to the process used to fine tune a model to produce forecasts that are close to the observations.

For the purposes of description the term "adaptive dynamic refinement" is intended to refer to those areas of interest that can be dynamically changed as new information is acquired and computation progresses. In one example, if a system needs to track features which are moving in time, then a dynamic scheme may be adopted.

For the purposes of description the term "probabilistic forecasting" is intended to refer to summarizing opinions or knowledge about future events by assigning a probability to each of a number of different outcomes.

For the purposes of description the term "ensemble forecasting" is intended to refer to the derivation of probability information using several model runs.

In one embodiment, a methodology is provided for coupling models and measurements that represent environmental factors related to flood impacts on business operations to the optimization issues that drive decision making.

In another embodiment, a system that recommends to users optimized and/or customized responses in a predictive fashion with lead time for flooding events is provided.

In another embodiment, a method that recommends to users optimized and/or customized responses in a predictive fashion with lead time for flooding events is provided.

In another embodiment, an algorithm that recommends to users optimized and/or customized responses in a predictive fashion with lead time for flooding events is provided.

In another embodiment, feedback from a decision support system to improve flood forecast accuracy when and where it is needed (e.g., using adaptive, dynamic refinement to narrow the search for an optimal response) is provided.

In another embodiment, coupled physical ensemble modeling using data assimilation of real-time and archived observations is provided.

In another embodiment, an auto-calibrated, adaptive observing system (and corresponding method and algorithm) are provided.

In another embodiment, geo-located socio-economic, infrastructure and environmental information (e.g., demographic, transportation, water, energy, personnel, topography, land use, real estate, history, etc.) may be utilized in recommending responses.

In another embodiment, decision-making rules that ingest probabilistic forecasts and valuation data to estimate: impact, confidence in results and determine gaps in available data may be provided.

In another embodiment, optimized resource allocation, planning and scheduling including recommended communications, transportation routes, critical supplies, etc. may be provided.

Referring now to FIG. 1, this Fig. shows a block diagram of a system according to one embodiment. Data sources 101 are accessible, for example, via the Internet 102, by a control center 106. This control center 106 may concentrate the activities of data collection, data analysis and recommendations. This control center 106 may be in operative communication with processor 103 and memory 104. The control center 106 and the processor 103 may perform operations on the data (using local memory 104) and provide recommendations 105 (to, for example, one or more users). In one example, the recommendations may be provided via the Internet 102.

Figure 2A:
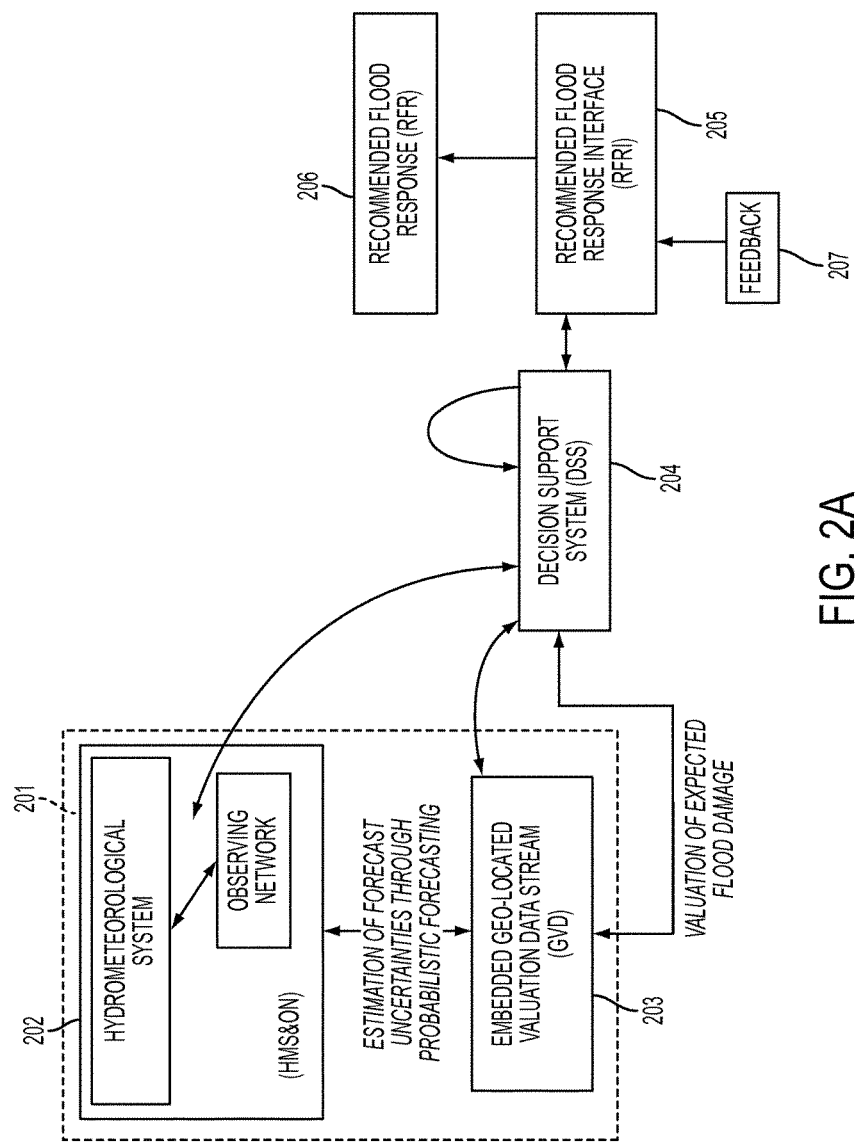
FIG. 2A depicts a block diagram of a system according to one embodiment.

Referring now to FIG. 2A, this Fig. shows a block diagram of a system according to one embodiment. As seen, Forecasting System 201 is shown. This Forecasting System 201 includes a coupled Hydrometeorological System and Observing Network ("HMS&ON") 202 and an Embedded Geo-located Valuation Data Stream ("GVD") 203. HMS&ON 202 and GVD 203 communicate back and forth between each other. In particular, HMS&ON 202 communicates estimations of forecast uncertainties through probabilistic forecasting to GVD 203. The Forecasting System 201 communicates back and forth to a Decision Support System ("DSS") 204. Further, GVD 203 creates valuation of expected flood damage and sends such valuation of expected flood damage to DSS 204. The DSS 204 creates and outputs a recommended flood response ("RFR") 206 via recommended flood response interface ("RFRI") 205. This embodiment provides feedback from DSS 204 to any one or more of the system components (HMS & ON, GVD, DSS, RFRI) or to a combination thereof to improve flood forecast accuracy at specified locations and times. This embodiment further provides adaptive dynamic refinement of HMS&ON and GVD to initiate an updated flood estimate iteration and to narrow down the search for an optimal flood response solution. Further, this embodiment provides Feedback 207 (e.g., user feedback based on the RFR 206) to RFRI 205 (e.g., for further use by RFRI 205, DSS 204, GVD 20, and/or HMS&ON 202).

Still referring to FIG. 2A, a function of the observing network is to provide data for decision making (e.g., data flow from HMS&ON 202 to DSS 204). In one example, the quality of the information may be evaluated (e.g., by DSS 204) and one or more observation stations, or sensors, can be activated/deactivated and/or considered more/less important (weighted) depending on the quality of the data provided. Data regarding this evaluation may be communicated back to the observing network (e.g., data flow from DSS 204 to HMS&ON 202).

Figure 2B:
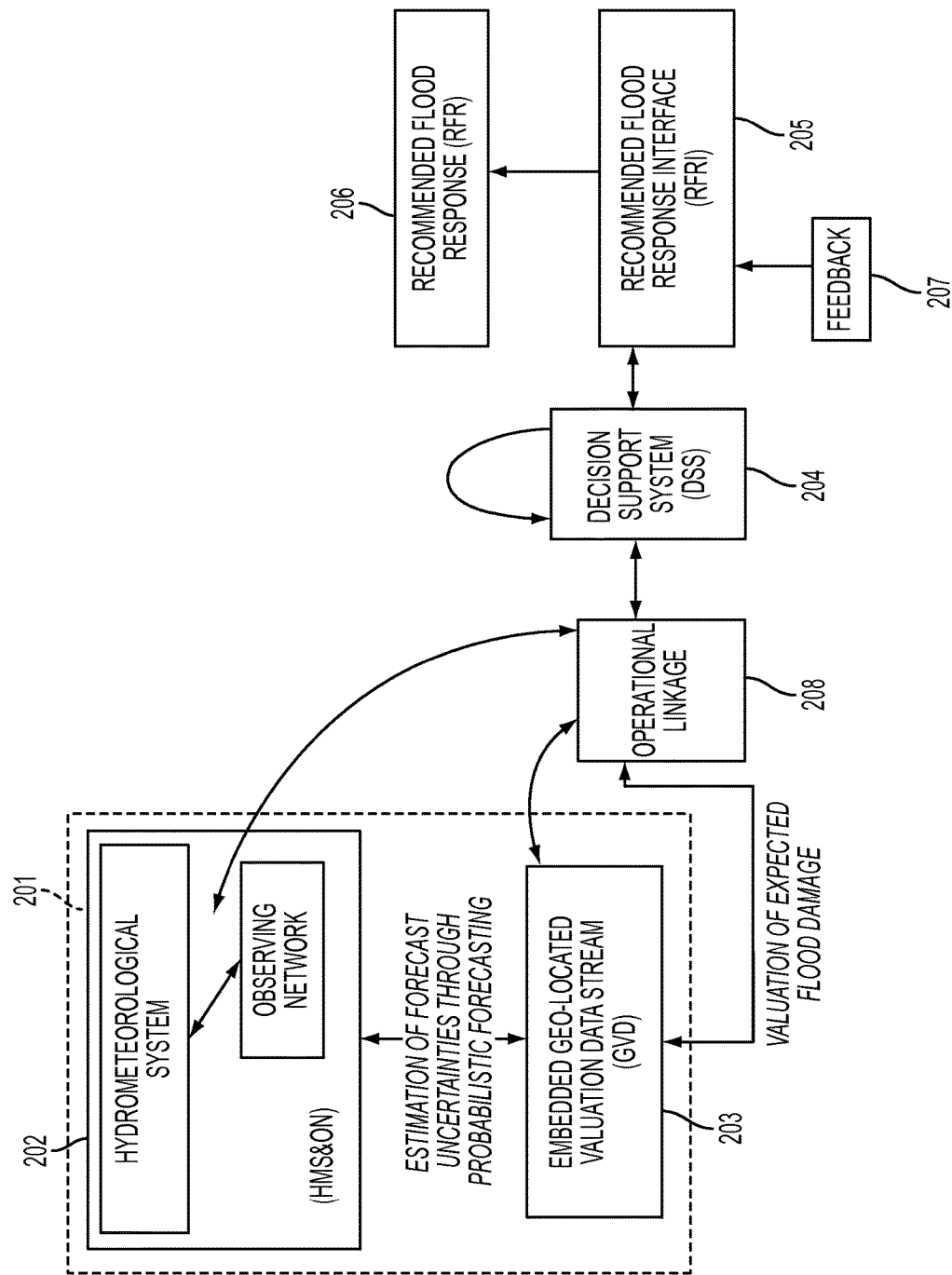
FIG. 2B depicts a block diagram of a system according to one embodiment.

Referring now to FIG. 2B, this Fig. shows a block diagram of a system according to one embodiment. This FIG. 2B is similar to FIG. 2A, with the addition of Operational Linkage 208 added between GVD 203 and DSS 204.

In one example, the DSS 204 may be remote from one or more of the other components (e.g., in a remote center of operation) and the Operational Linkage 208 may be used for communication into and out of the DSS 204.

Referring now once again to FIG. 2A, various examples of feedback from the DSS 204 (shown as two-way arrows) to HMS&ON 202 and GVD 203 will now be described. Reference will first be made to one example of feedback to GVD 203: As the center of operations start to implement recommendations made by the RFRI 205 (for example, deployment of people, equipment, sandbags, pumps, etc), the estimated impact of the flooding can be reduced and this can be taken into account in the GVD 203 since the valuation of expected flood damage may decrease for some areas. Another example allows the DSS 204 to make additional refined recommendations and/or reprioritize other affected areas. Reference will now be made to one example of feedback to HMS&ON 202: As decisions are implemented, e.g., deployment of sandbags, one could include these barriers in the topographical model used to do high resolution prediction on how the sandbags would alter the flooding patterns expected in the first place.

In another example, the valuation process may take into account local information regarding the local infrastructure and/or types of business, houses, etc. that are present in the relevant area to make statistical inferences of the expected damages, costs, and/or impacts. For example, if there are houses with finished basements and business with inventory storage, or fabs with costly manufacturing equipment, or hospitals with electrical installations in areas that are subject to expected flooding. In one example, one can estimate the magnitude of damages, and/or its costs based on historical insurance claims.

Figure 3:
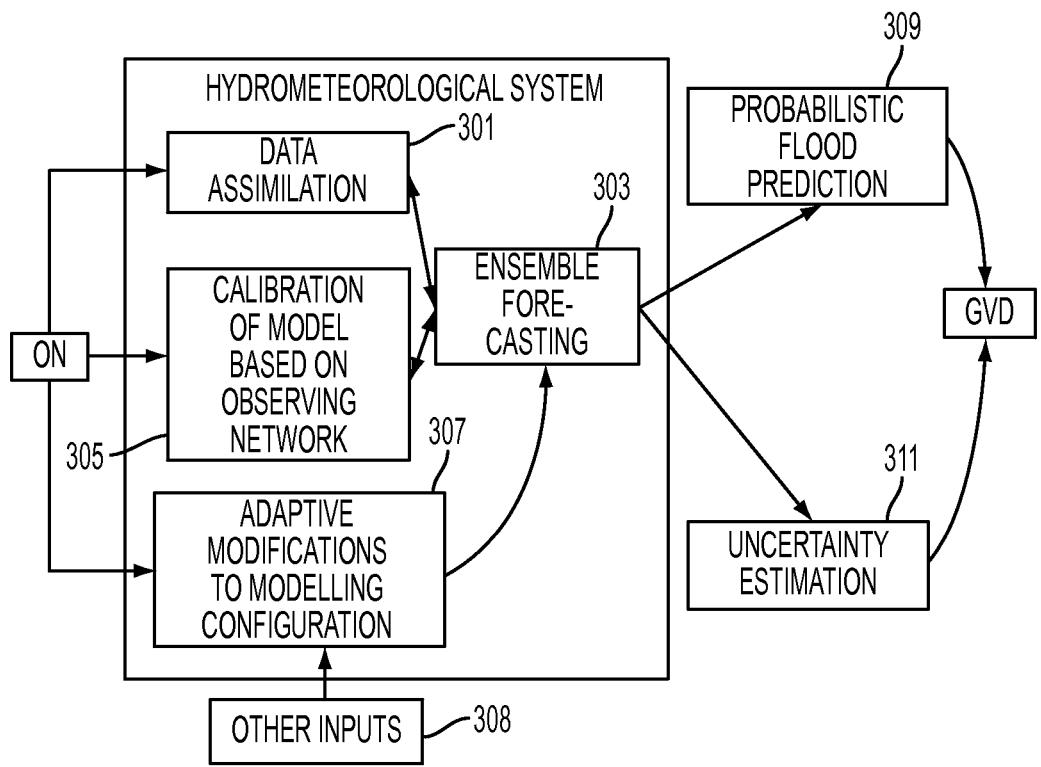
FIG. 3 depicts a block diagram showing additional detail of the hydrometeorological system component of FIGS. 2A and 2B.

Referring now to FIG. 3, it is seen that in this embodiment the hydrometeorological component (see HMS&ON element 202 of FIGS. 2A and 2B) includes the following functionality and features: (a) performing data assimilation using information provided by the observing network component (see HMS&ON element 202 of FIGS. 2A and 2B) in real-time and/or from historical datasets (see element 301); (b) performing ensemble forecasting to provide probabilistic forecasting and to estimate flood forecast uncertainties (see element 303); (c) performing calibration of the modeling system using the observing network (see HMS&ON element 202 of FIGS. 2A and 2B) information (see element 305); and (d) performing adaptive modifications to modeling configuration, including the computational grid and physical parameterizations (see element 307). In one example, other inputs (see element 308) may be provided to element 307.

Still referring to FIG. 3, it is seen that in this embodiment the hydrometeorological component (see HMS&ON element 202 of FIGS. 2A and 2B) further includes the following functionality and features: providing probabilistic flood prediction (see element 309) and uncertainty estimation (see element 311) to GVD (see GVD 203 of FIGS. 2A and 2B).

Further, the HMS may comprise, for example, one or more assemblies, modules, or the like to provide the functionality and features described herein.

Figure 4:
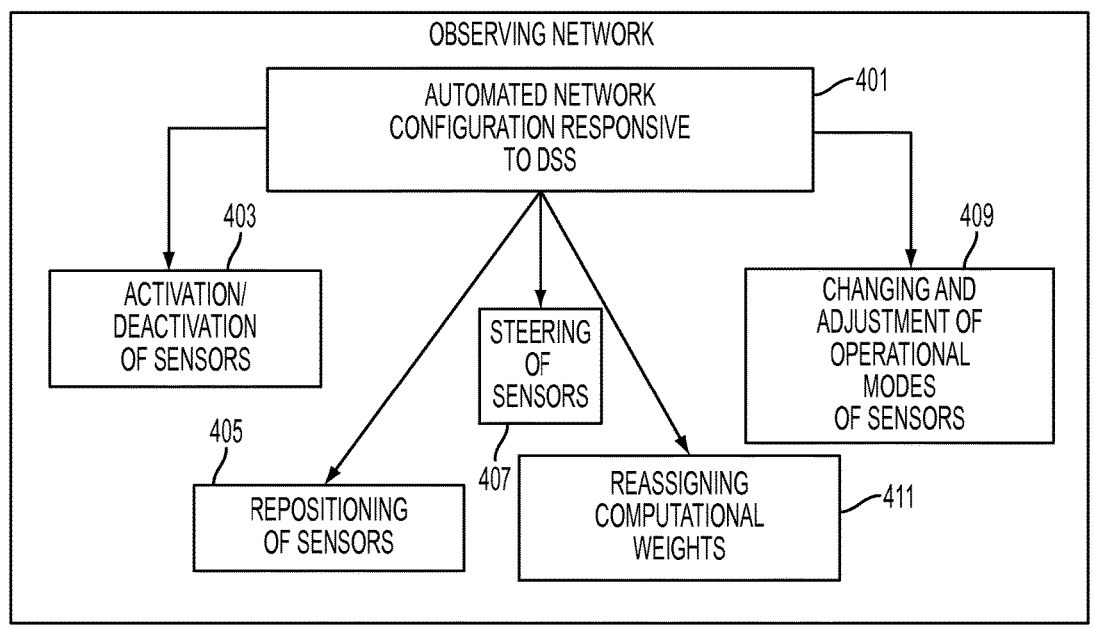
FIG. 4 depicts a block diagram showing additional detail of the observing network component of FIGS. 2A and 2B.

Referring now to FIG. 4, it is seen that in this embodiment the observing network component (see HMS&ON element 202 of FIGS. 2A and 2B) includes automated network configuration (see element 401) based on the information exchange including: (a) activation/deactivation of sensors (see element 403); (b) repositioning of sensors (see element 405); (c) steering of sensors (see element 407); (d) changing and adjustment of operational modes of sensors (see element 409); and (e) computational weights reassignment (see element 411).

Further, the observing network may comprise, for example, one or more assemblies, modules, or the like to provide the functionality and features described herein.

Figure 5:
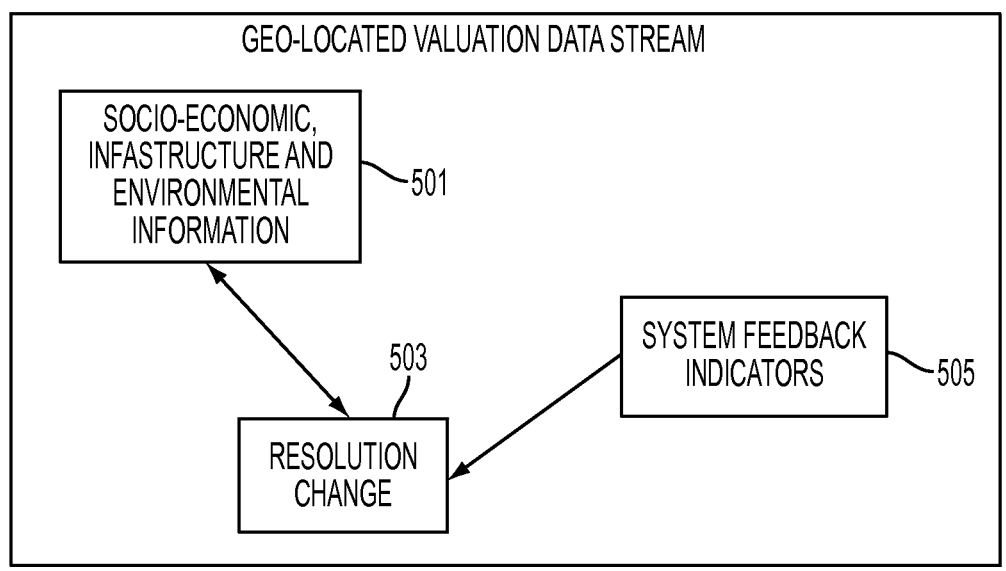
FIG. 5 depicts a block diagram showing additional detail of the geo-located valuation data stream component of FIGS. 2A and 2B.

Referring now to FIG. 5, it is seen that in this embodiment the geo-located valuation data stream component (see GVD element 203 of FIGS. 2A and 2B) contains detailed socio-economic, infrastructure and environmental information (see element 501) at high spatial resolution. In various examples, the socio-economic, infrastructure and environmental information may include (but not be limited to): demographic, transportation, water, energy, personnel, topography, land use, real estate, financials, history, etc. The geo-located valuation data stream component of this embodiment further includes the following functionality and features: (a) resolution change (see element 503); and (b) system feedback indicators (see element 505).

In this context, high resolution would imply information with fine granularity. For example, in a city, high resolution could be smaller than blocks (e.g., an indication what kind of buildings are in a particular block, if there are business, schools, etc.). So if a decision has to be made, like an evacuation, the recommendations could be customized for that level of granularity. In rural areas, high resolution may be coarser, depending, for example, on the distribution of local infrastructure (which normally is less dense than cities).

Further, in this embodiment the geo-located valuation data stream component includes the following functionality and features: (a) provides data output at requested resolution; (b) contains real-time and/or historical datasets depending on context; (c) static and dynamic environmental data sets can also be accessed by HMS component; and (d) physically represents a distributed system.

Further, the GVD may comprise, for example, one or more assemblies, modules, or the like to provide the functionality and features described herein.

As mentioned, the geo-located valuation data stream component may communicate to other component(s) context data related to socio-economic, infrastructure and environmental information at high spatial resolution. This communicated information can be used, for example, to refine the model in places where a disaster occurs in one or more densely populated areas (otherwise there may be essentially no need to refine the model given that the impact of a natural disaster may not cause a large impact (e.g., financial impact and/or loss of life)).

Figure 6:
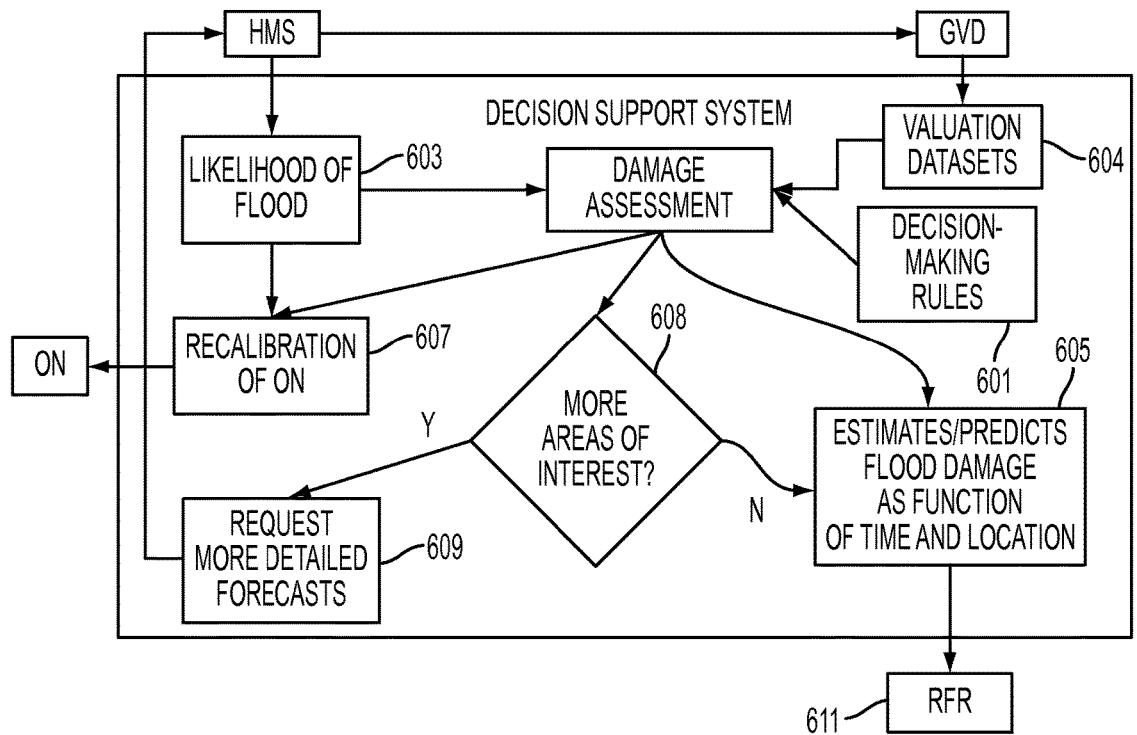
FIG. 6 depicts a block diagram showing additional detail of the decision support system component of FIGS. 2A and 2B.

Referring now to FIG. 6, it is seen that in this embodiment the Decision Support System component (see DSS element 204 of FIGS. 2A and 2B) includes the following functionality and features: (a) contains a set of decision making rules (see element 601); (b) ingests from HMS (see element 202 of FIGS. 2A and 2B) probabilistic flood forecast and information about forecast uncertainty (see element 603); (c) ingests from GVD (see element 203 of FIGS. 2A and 2B) valuation datasets (see element 604); (d) estimates/predicts flood damage as a function of time and location (see element 605) using the set of decision making rules; (e) initiates recalibration of observation network (see element 607 and element 201 of FIGS. 2A and 2B); and (f) decides (see element 608) whether there are one or more areas which require more accurate flood forecast information: (1) IF YES: feeds back a request to HMS&ON component (see element 202 of FIGS. 2A and 2B) to initialize additional flood forecast(s) for selected area(s) (see element 609); and (2) IF NO: provides information to finalize the recommended flood response (see element 611 and element 206 of FIGS. 2A and 2B).

The decision making rules may include (but not be limited to) the following: flooding damage may be associated with the type of area and its impact. In one specific example, if the area is a commercial zone, the rule may be to advise store owner(s) to move inventory and the flooding damage may be calculated by estimating goods lost/damaged. In another specific example, in a rural area, the flooding damage may be more related to infrastructure and livestock lost.

Further, the DSS may comprise, for example, one or more assemblies, modules, or the like to provide the functionality and features described herein.

With reference now to the Recommended Flood Response Interface component (see element 205 of FIGS. 2A and 2B), the RFRI component includes the following functionality and features: (a) provides resource allocation, planning and scheduling; (b) processes information from the DSS component to issue a recommended flood response list of actions; (c) provides a flood response list of actions including (but not limited to): (1) communicating the recommended flood response message to all involved agencies and organizations; (2) evacuating population; (3) securing transportation routes; (4) securing critical supplies; (5) isolating affected infrastructure; (6) deployment of personnel and equipment (e.g., boats, pumps, etc); and (d) communicating continuous updates about anticipated and taken flood response actions.

In one example, the recommended flood response may be a set of time-varying recommendations. In another example, the recommended flood response may comprise resource allocation involving police, firemen, ambulances and/or civil defense. In another example, this may be coordinated and deployed according to the severity of the disaster (e.g., from few days in advance to a few hours before the event). In another example, the recommended flood response may comprise rerouting traffic, sending help, moving people from their houses, moving people from their business, etc.

Figure 7:
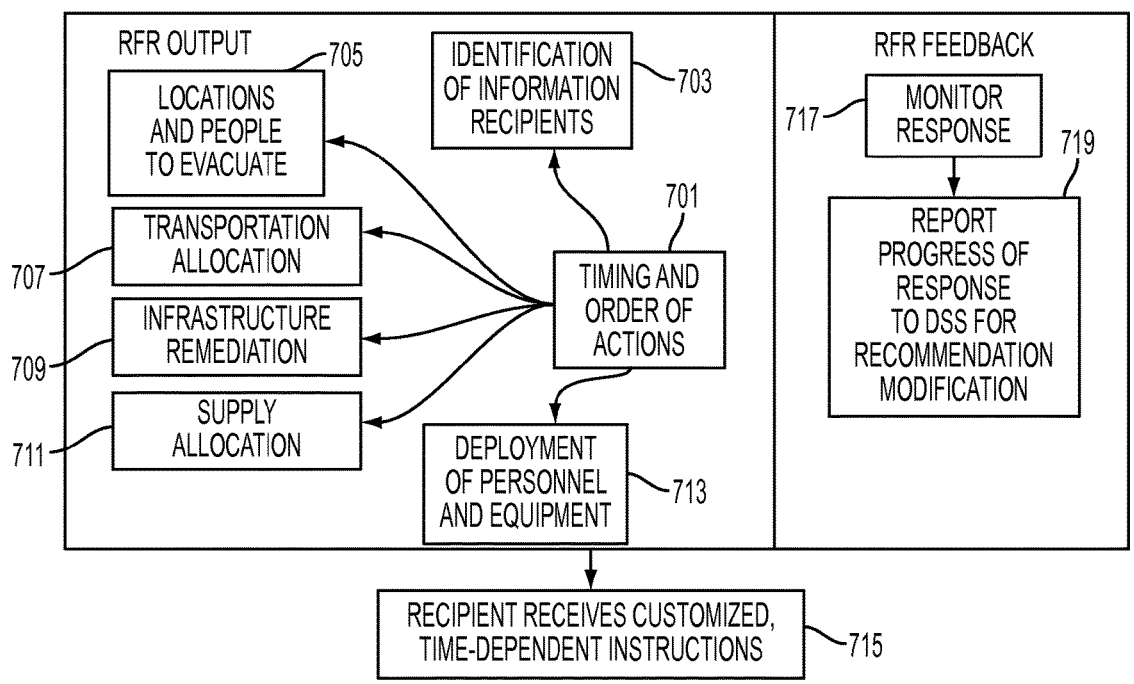
FIG. 7 depicts a block diagram showing additional detail of the recommended flood response interface component of FIGS. 2A and 2B.

Referring now to FIG. 7, it is seen that the RFRI may provide for RFR Output as follows: timing and order of actions (see element 701); identification of information recipients (see element 703); locations and people to evacuate (see element 705); transportation allocation (see element 707); infrastructure remediation (see element 709); supply allocation (see element 711); deployment of personal and equipment (see element 713). As seen, one or more recipients receive (as the RFR Output) customized time-dependent instructions (see element 715).

Still referring to FIG. 7, it is seen that the RFRI may provide for RFR Feedback as follows: monitor response (see element 717); report progress of response to DSS for recommendation modification (see element 719).

Further, the RFRI may comprise, for example, one or more assemblies, modules, or the like to provide the functionality and features described herein.

As described herein, various embodiments may provide one or more of the following functionality and features: (a) combine observations and simulations: forecasts produced by the Hydrometeorological System (HMS) and Observing Networks (ON) provide information to the Decision Support System (DSS) for flood response operations; (b) flooding forecasts that take into account uncertainties cascading through the entire integrated system; (c) Geo-located Valuation Data Stream (GVD) is seamlessly embedded (and automatically accessed) by any part of the integrated system; (d) makes use of the convergence of science, available data and high-performance computing: (1) fidelity of simulations enabling viable decision support applications and risk assessment; and (2) advances in computational solutions and in observing technologies (both in situ and remote sensing) allow the reduction of forecast uncertainties where and when they are needed (e.g., as defined by the GVD).

As described herein, various embodiments may provide one or more of the following functionality and features: (a) implements an automated feedback from the Decision Support System to any of the components used; (b) will intelligently select areas and times where flood forecast accuracy is crucial or desirable (e.g., areas that historically have been subject to flooding and/or highly sensitive areas (e.g., with underground transportation system(s) and/or electrical grid subsystem(s)); (c) as defined by the continuous feedback from DSS to HMS&ON component, several dynamic adaptation procedures can be triggered: (1) grid refinement and recalibration of HMS parameters; (2) initiation of ensemble forecasts for selected areas; (d) reconfiguration of observing network through (physical) sensor reactivation, changing of operational modes, or repositioning and computational weights reassignment; and (e) additional set of flood forecasts will be performed to reduce uncertainty for selected areas and to improve response to the anticipated flooding event.

In one example, grid refinement may provide high accuracy and resolution in the modeling of the affected area(s). This may be necessary, for example, in urban environments with complex infrastructure when an operator may want to know the impact in the affected area(s) with a few meters of resolution.

In another example, modes may be states of the stations, or sensors, which can collect more (or less) data and/or more (or less) frequent data. In another example, a given station, or sensor, may provide better quality data and/or more relevant data for a given event and thus such a station, or sensor, may be given more weight (e.g., during a calibration process) than a station further away from the event and/or with less quality data.

As described herein, various embodiments may provide: bi-directional exchange of information between integrated flood-impact forecasting components to improve quality of temporal and spatial response to flooding events—in one example, a feedback loop of information exchange is used to enhance functionalities of forecasting components in a dynamic manner and to reduce uncertainties in the choice of the best solution.

As described herein, various embodiments may provide various components with different functionalities, e.g.: hydrometeorological component, observing network component, geo-located valuation data stream component, decision support system component, recommended flood response interface component.

In one example, the hydrometeorological component is capable of: (a) performing data assimilation using information provided by the observing network component in real-time and/or from historical datasets; (b) performing ensemble forecasting to provide probabilistic forecasting and to estimate flood forecast uncertainties; (c) performing calibration of the modeling system using the observing network information; and (d) performing adaptive modifications to the modeling configuration, including the computational grid and physical parameterizations.

In one example, the observing network component is capable of automated network configuration based on the information exchange, which includes activation/deactivation of sensors, steering of sensors, changing of operational modes of sensors, repositioning sensors and/or computational weights reassignment.

In one example, the geo-located valuation data stream component will contain detailed socio-economic, infrastructure and environmental information at high spatial resolution. Based on the feedback loop system indicators, the spatial resolution of the GVD can be changed dynamically.

In one example, the decision support system component is able to identify areas where flood forecast certainty is below a threshold which is unacceptable while estimated value-based flood damage is high. Through a feedback loop the DSS may request system reconfiguration and/or recalibration and may initiate a more accurate forecast for areas of interest.

In another example, spatial and temporal aspects of the operational response for flooding events may be improved.

As described herein, various embodiments may provide within one integrated system: (a) a coupled HMS&ON; (b) an estimation of forecast uncertainties through probabilistic forecasting; (c) an embedded geo-location based valuation data stream; (d) an operational linkage to a DSS; (e) valuation of expected flood damage; (f) feedback from DSS to any component or components (e.g., HMS, ON, GVD, DSS, RFRI) or to a combination of those to improve flood forecast accuracy at specified locations and times; (g) adaptive dynamic refinement of HMS&ON and/or GVD to initiate the next flood estimate iteration and to narrow down an optimal flood-response solution search.

As described herein, various embodiments may provide one or more of the following functionality and features: (a) may be built from a variety of weather forecasting models, hydrological models and observing systems; (b) may rely on geospatial data and may use a variety of data formats; (c) decision support system component may use a variety of metrics based on one or more user-defined values; (d) a feedback mechanism may provide a possibility of information exchange between any two (or more) components.

As described herein, various embodiments may provide an ability to automatically define (or classify) areas for distinct operational response for flooding events.

Figure 8:
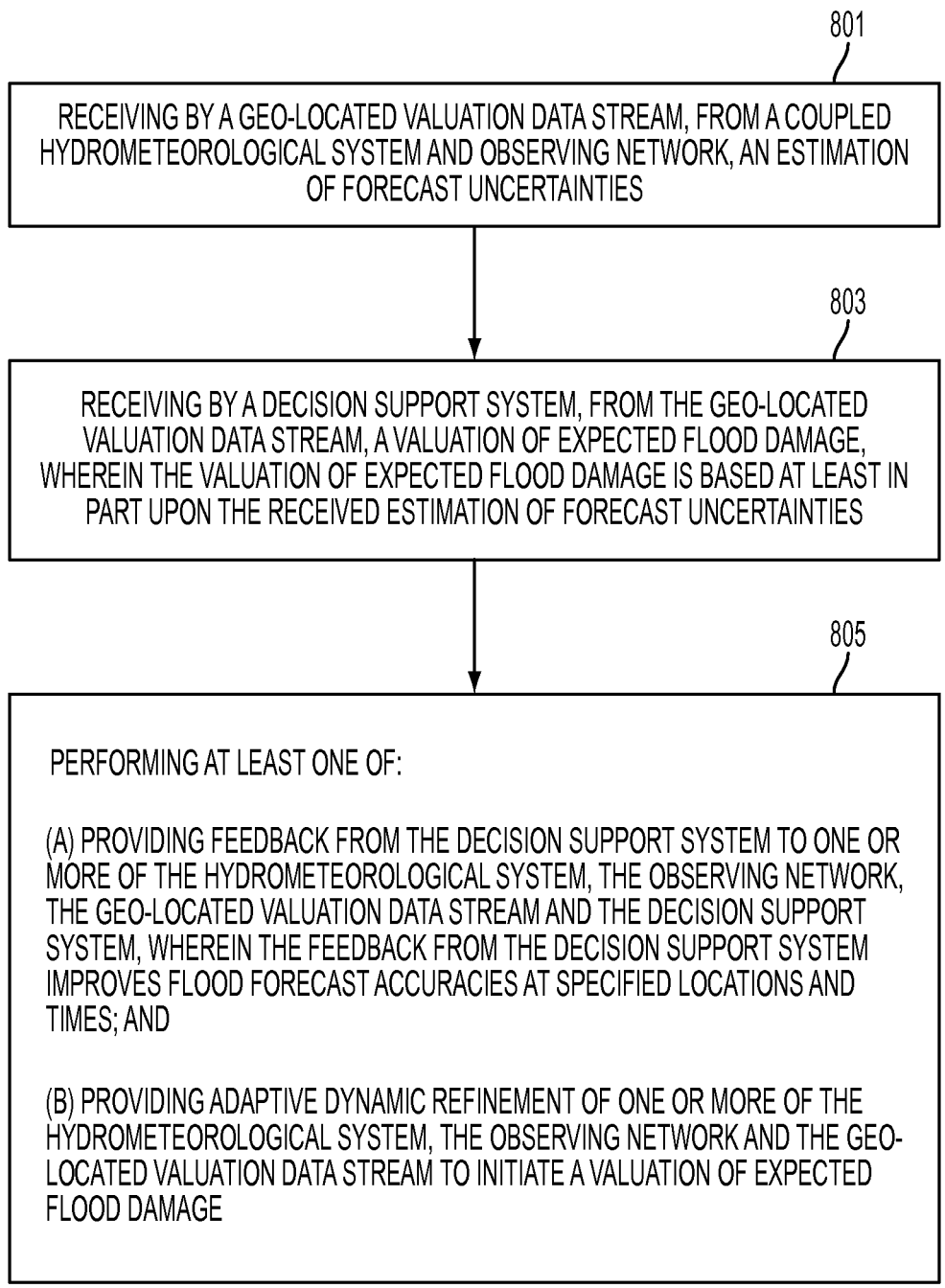
FIG. 8 depicts a block diagram of a method according to one embodiment.

Referring now to FIG. 8, a method (e.g., implemented in a computer system) for generating a recommended response to flooding according to an embodiment is shown. As seen in this FIG. 8, the method of this embodiment comprises: Step 801—receiving by a geo-located valuation data stream, from a coupled hydrometeorological system and observing network, an estimation of forecast uncertainties; Step 803—receiving by a decision support system, from the geo-located valuation data stream, a valuation of expected flood damage, wherein the valuation of expected flood damage is based at least in part upon the received estimation of forecast uncertainties; and Step 805—performing at least one of: (a) providing feedback from the decision support system to one or more of the hydrometeorological system, the observing network, the geo-located valuation data stream and the decision support system, wherein the feedback from the decision support system improves flood forecast accuracies at specified locations and times; and (b) providing adaptive dynamic refinement of one or more of the hydrometeorological system, the observing network and the geo-located valuation data stream to initiate a valuation of expected flood damage.

Figure 9:
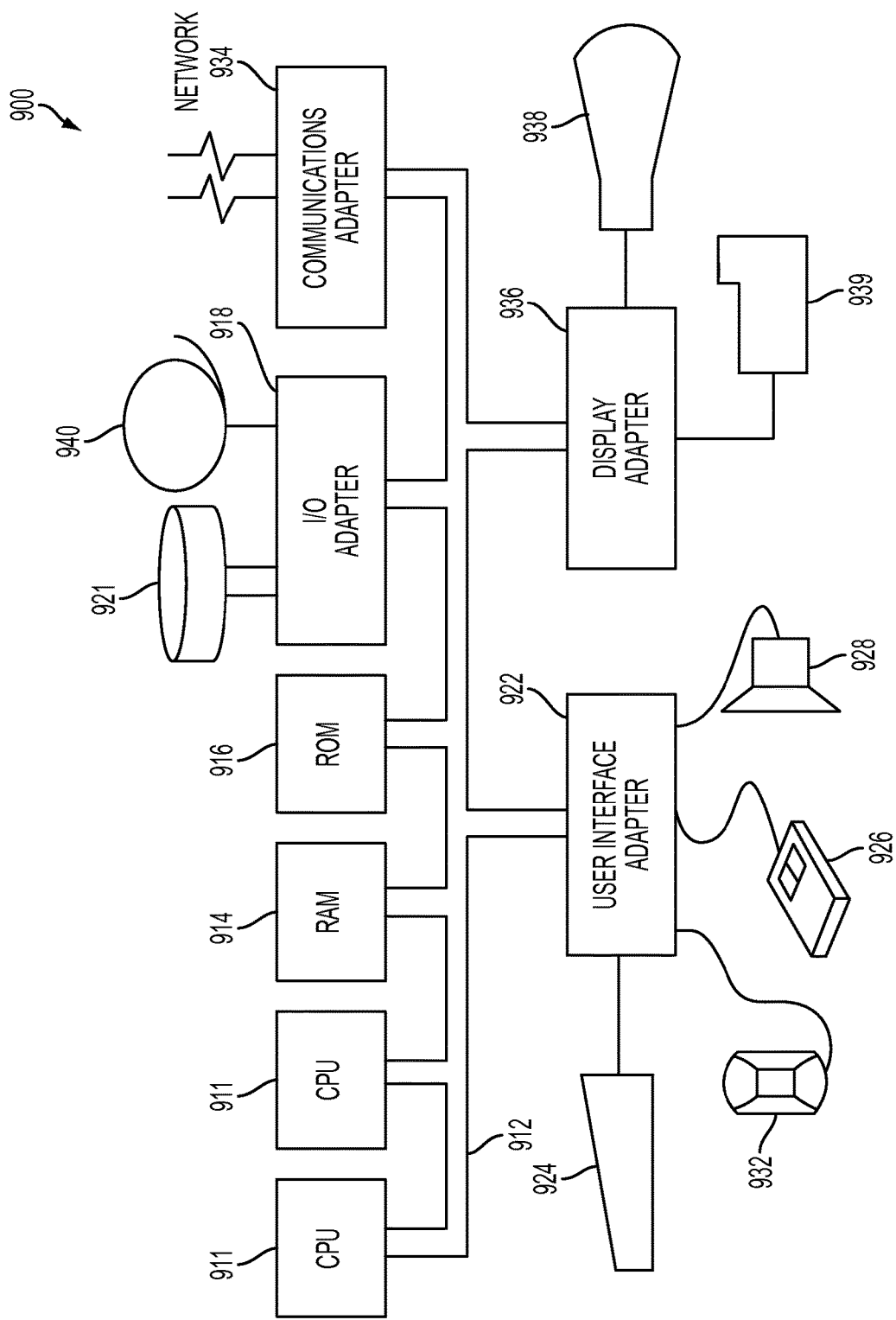
FIG. 9 depicts a block diagram of a system according to one embodiment.

Referring now to FIG. 9, this Fig. shows a hardware configuration of computing system 900 according to an embodiment. As seen, this hardware configuration has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communications adapter 934 for connecting the system 900 to a data processing network, the Internet, an Intranet, a local area network (LAN), etc., and a display adapter 936 for connecting the bus 912 to a display device 938 and/or printer 939 (e.g., a digital printer or the like).

As described herein, various embodiments relate to disaster response (e.g., weather related disaster response), including, for example, computerized support for response to disaster events (e.g., flood, hurricane, tornado, fire, wind, earthquake, volcano). In one example, the response and response system may be adjusted to the specific type of disaster.

Further, each of the assemblies, modules, components or the like described herein may have its own functional responsibilities.

Further, each of the assemblies, modules, components or the like described herein may be co-located with one or more of the other assemblies, modules, components or the like.

Further, each of the assemblies, modules, components or the like described herein may be remotely located relative to one or more of the other assemblies, modules, components or the like.

In other examples, various embodiments may operate offline, online or a combination of both.

As described herein, typical response operations are: rerouting of traffic; deployment of sandbags, hoses and pumps; evacuation; notification of authorities (e.g., police, fire dept, central transit control, health, etc). In one example, feedback from the decision support system may be provided as bulletins that can be updated regularly. The feedback may contain, for example, text, maps, suggestions of personnel, organizations, and actions that should be taken. There are feedbacks that can be provided based on the forecast in anticipation of the event for preparedness (e.g., every 6 hours 36 hours before the event to 1 hour 6 hours before the event). More frequent updates can be continuously provided during the event, and summary reports may be provided after the event (with, for example, assessment of the quality of the forecasts and recommendations).

In one example, the DSS has a series of embedded processes which maps and lists all the questions that have been asked and/or addressed based on previous experiences and/or best practices.

As described herein, the uncertainty (e.g., related to the estimation of forecast uncertainties) may be described using statistical techniques and diagrams such as histograms with the probability distribution for variables of interest such as accumulated amount of rainfall, time of beginning of the event, expected duration of the event, etc. In one example, the uncertainty may be assessed at the same frequency that the forecasts are provided (which can range, for example, from 2 to 12 hours depending on the computational resources and the number of simulations in the ensembles).

As described herein, one reason for the dynamic refinement from the decision support system is based on the idea that as the evolution of the forecast and its potential impact to the area of the expected event is understood, the model is can be adapted and refined (e.g., the area of more interest can be refined to have higher resolution and better accuracy forecast). In various examples, better adaptation can be provided for areas that are historically know to have high demographic concentrations and/or past severe weather and/ or past severe flooding events. This kind of information can be used to not only refine the resolution but also to refine specific microphysics models. For example, if the event is expected in a tropical city, a specific microphysics model for topical and urban canopy physics can be dynamically activated and tuned for the area and season As described herein, forecasts may be generated as frequently as there is a need (e.g., a business need) and there are computational resources available. In one example, forecasts can be created with frequencies varying from 12 to 4 hours with forecast lead times varying from 36 to 72 hours.

In various examples, forecasts may be provided in the form of bulletins, maps and/or diagrams of the main variables of interest (e.g., amount of precipitation, air humidity, wind velocity, temperature and/or amount of accumulated rain water on areas subject to flooding).

In one embodiment, a computer-implemented system for generating a recommended response to flooding is provided, the system comprising: a decision support system; a hydrometeorological system coupled to an observing network; and a geo-located valuation data stream; wherein the geo-located valuation data stream is in operative communication with the coupled hydrometeorological system and observing network such that the geo-located valuation data stream receives from the coupled hydrometeorological system and observing network an estimation of forecast uncertainties; wherein the geo-located valuation data stream is in operative communication with the decision support system such that the decision support system receives from the geo-located valuation data stream a valuation of expected flood damage, wherein the valuation of expected flood damage is based at least in part upon the received estimation of forecast uncertainties; and wherein at least one of the following is provided: (a) feedback via operative communication from the decision support system to one or more of the hydrometeorological system, the observing network, the geo-located valuation data stream and the decision support system, wherein the feedback from the decision support system improves flood forecast accuracies at specified locations and times; and (b) adaptive dynamic refinement via operative communication from the decision support system of one or more of the hydrometeorological system, the observing network and the geo-located valuation data stream to initiate a valuation of expected flood damage.

In one example, the recommended response is to a forecast flooding.

In another example, the recommended response is to an actual flooding.

In another example, the system further comprises an output element in operative communication with the decision support system.

In another example, the output element outputs at least one recommended response to flooding.

In another example, the output element outputs the recommended response to flooding to at least one of: (a) a display monitor; (b) a digital file; and (c) a printer.

In another example, each of the following is provided: (a) feedback via operative communication from the decision support system to one or more of the hydrometeorological system, the observing network, the geo-located valuation data stream and the decision support system; and (b) adaptive dynamic refinement via operative communication from the decision support system of one or more of the hydrometeorological system, the observing network and the geo-located valuation data stream to initiate evaluation of expected flood damage.

In another example, the estimation of forecast uncertainties is made using probabilistic forecasting.

In another example, the feedback from the decision support system is made to a plurality of: the hydrometeorological system, the observing network, the geo-located valuation data stream and the decision support system.

In another example, the adaptive dynamic refinement of one or more of the hydrometeorological system, the observing network and the geo-located valuation data stream further initiates a subsequent expected flood damage iteration.

In another example, the adaptive dynamic refinement of one or more of the hydrometeorological system, the observing network and the geo-located valuation data stream further narrows down an optimal flood-response solution search.

In another example, the operative communication with the decision support system is via an operational linkage to the decision support system.

In another example, the steps are carried out in the order recited.

In another embodiment, a method for generating a recommended response to flooding is provided, the method comprising: receiving by a geo-located valuation data stream, from a coupled hydrometeorological system and observing network, an estimation of forecast uncertainties; receiving by a decision support system, from the geo-located valuation data stream, a valuation of expected flood damage, wherein the valuation of expected flood damage is based at least in part upon the received estimation of forecast uncertainties; and performing at least one of: (a) providing feedback from the decision support system to one or more of the hydrometeorological system, the observing network, the geo-located valuation data stream and the decision support system, wherein the feedback from the decision support system improves flood forecast accuracies at specified locations and times; and (b) providing adaptive dynamic refinement of one or more of the hydrometeorological system, the observing network and the geo-located valuation data stream to initiate a valuation of expected flood damage.

In one example, the recommended response is to a forecast flooding.

In another example, the recommended response is to an actual flooding.

In another example, the method further comprises outputting at least one recommended response to flooding.

In another example, the steps are carried out in the order recited.

In another embodiment, a program storage device readable by machine, tangibly embodying a program of instructions executable by the machine for generating a recommended response to flooding is provided, the program of instructions, when executing, performing the following steps: receiving by a geo-located valuation data stream, from a coupled hydrometeorological system and observing network, an estimation of forecast uncertainties; receiving by a decision support system, from the geo-located valuation data stream, a valuation of expected flood damage, wherein the valuation of expected flood damage is based at least in part upon the received estimation of forecast uncertainties; and performing at least one of: (a) providing feedback from the decision support system to one or more of the hydrometeorological system, the observing network, the geo-located valuation data stream and the decision support system, wherein the feedback from the decision support system improves flood forecast accuracies at specified locations and times; and (b) providing adaptive dynamic refinement of one or more of the hydrometeorological system, the observing network and the geo-located valuation data stream to initiate a valuation of expected flood damage.

In one example, the recommended response is to a forecast flooding.

In another example, the recommended response is to an actual flooding.

In another example, the program of instructions, when executing, further performs the following step: outputting at least one recommended response to flooding.

In another example, the steps are carried out in the order recited.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer-implemented system for generating a recommended response to flooding, the system comprising:
a decision support system;
a hydrometeorological system coupled to an observing network;
a geo-located valuation data stream; and
an output element in operative communication with the decision support system, the output element being configured for generating the recommended response to flooding, wherein the recommended response to flooding comprises one or more of: a recommended communication, a recommended transportation route, or a recommendation identifying one or more critical supplies;
wherein the geo-located valuation data stream is in operative communication with the coupled hydrometeorological system and observing network such that the geo-located valuation data stream receives from the coupled hydrometeorological system and observing network an estimation of forecast uncertainties;
wherein the geo-located valuation data stream is in operative communication with the decision support system such that the decision support system receives from the geo-located valuation data stream a valuation of expected flood damage, wherein the valuation of expected flood damage is based at least in part upon the received estimation of forecast uncertainties; and
wherein each of the following is provided:
(a) feedback via operative communication from the decision support system to one or more of the hydrometeorological system, the observing network, the geo-located valuation data stream and the decision support system, wherein the feedback from the decision support system improves flood forecast accuracies at specified locations and times; and
(b) adaptive dynamic refinement via operative communication from the decision support system of one or more of the hydrometeorological system, the observing network and the geo-located valuation data stream to initiate a valuation of expected flood damage;
wherein, based upon the feedback, a spatial resolution of the geo-located valuation data stream is changed dynamically;
wherein the output element outputs the recommended response to flooding to at least one of: (a) a display monitor; (b) a digital file; and (c) a printer; and
wherein the output element is configured for receiving feedback from one or more recipients of the recommended response.

2. The system of claim 1, wherein the recommended response is to a forecast flooding.

3. The system of claim 1, wherein the recommended response is to an actual flooding.

4. The system of claim 1, wherein the estimation of forecast uncertainties is made using probabilistic forecasting.

5. The system of claim 1, wherein the feedback from the decision support system is made to a plurality of: the hydrometeorological system, the observing network, the geo-located valuation data stream and the decision support system.

6. The system of claim 1, wherein the adaptive dynamic refinement of one or more of the hydrometeorological system, the observing network and the geo-located valuation data stream further initiates a subsequent expected flood damage iteration.

7. The system of claim 6, wherein the adaptive dynamic refinement of one or more of the hydrometeorological system, the observing network and the geo-located valuation data stream further narrows down an optimal flood-response solution search.

8. The system of claim 1, wherein the operative communication with the decision support system is via an operational linkage to the decision support system.

9. The system of claim 1, wherein the feedback and the adaptive dynamic refinement are carried out in the order recited.

10. A method for generating a recommended response to flooding, the method comprising:
receiving by a geo-located valuation data stream, from a coupled hydrometeorological system and observing network, an estimation of forecast uncertainties;
receiving by a decision support system, from the geo-located valuation data stream, a valuation of expected flood damage, wherein the valuation of expected flood damage is based at least in part upon the received estimation of forecast uncertainties;
generating, by an output element in operative communication with the decision support system, the recommended response to flooding, wherein the recommended response to flooding comprises one or more of: a recommended communication, a recommended transportation route, or a recommendation identifying one or more critical supplies; and
performing each of:
(a) providing feedback from the decision support system to one or more of the hydrometeorological system, the observing network, the geo-located valuation data stream and the decision support system, wherein the feedback from the decision support system improves flood forecast accuracies at specified locations and times; and
(b) providing adaptive dynamic refinement of one or more of the hydrometeorological system, the observing network and the geo-located valuation data stream to initiate a valuation of expected flood damage;
wherein, based upon the feedback, a spatial resolution of the geo-located valuation data stream is changed dynamically;
wherein the output element outputs the recommended response to flooding to at least one of: (a) a display monitor; (b) a digital file; and (c) a printer; and
wherein the output element is configured for receiving feedback from one or more recipients of the recommended response.

11. The method of claim 10, wherein the recommended response is to a forecast flooding.

12. The method of claim 10, wherein the recommended response is to an actual flooding.

13. The method of claim 10, wherein the feedback and the adaptive dynamic refinement steps are carried out in the order recited.

14. A program storage device readable by machine, tangibly embodying a program of instructions executable by the machine for generating a recommended response to flooding, the program of instructions, when executing, performing the following steps:
receiving by a geo-located valuation data stream, from a coupled hydrometeorological system and observing network, an estimation of forecast uncertainties;
receiving by a decision support system, from the geo-located valuation data stream, a valuation of expected flood damage, wherein the valuation of expected flood damage is based at least in part upon the received estimation of forecast uncertainties;
generating, by an output element in operative communication with the decision support system, the recommended response to flooding, wherein the recommended response to flooding comprises one or more of: a recommended communication, a recommended transportation route, or a recommendation identifying one or more critical supplies; and
performing each of:
(a) providing feedback from the decision support system to one or more of the hydrometeorological system, the observing network, the geo-located valuation data stream and the decision support system, wherein the feedback from the decision support system improves flood forecast accuracies at specified locations and times; and
(b) providing adaptive dynamic refinement of one or more of the hydrometeorological system, the observing network and the geo-located valuation data stream to initiate a valuation of expected flood damage;
wherein, based upon the feedback, a spatial resolution of the geo-located valuation data stream is changed dynamically;
wherein the output element outputs the recommended response to flooding to at least one of: (a) a display monitor; (b) a digital file; and (c) a printer; and
wherein the output element is configured for receiving feedback from one or more recipients of the recommended response.

15. The program storage device of claim 14, wherein the recommended response is to a forecast flooding.

16. The program storage device of claim 14, wherein the recommended response is to an actual flooding.

17. The program storage device of claim 14, wherein the feedback and the adaptive dynamic refinement steps are carried out in the order recited.

* * * * *